June 16, 1942.  M. R. HUTCHISON, JR  2,286,808
FLASHLIGHT SYNCHRONIZING APPARATUS FOR CAMERAS
Filed April 24, 1940  2 Sheets-Sheet 1
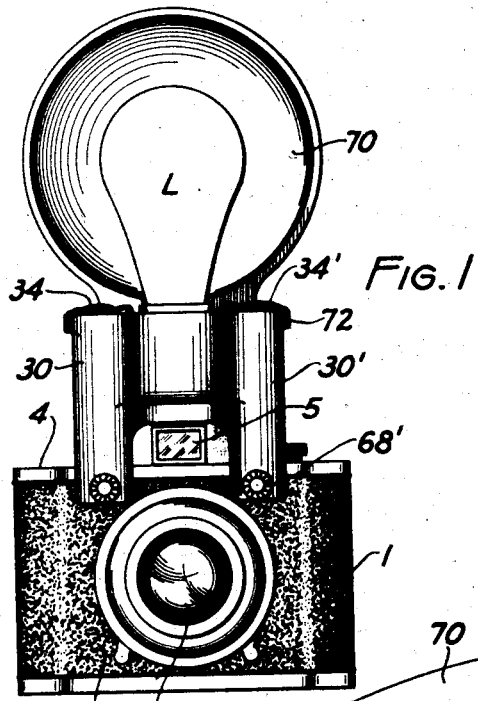
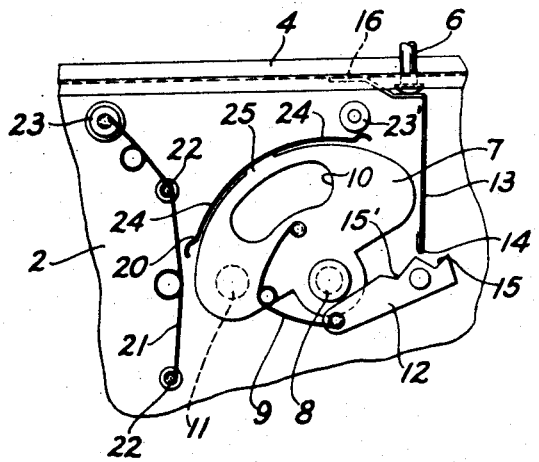
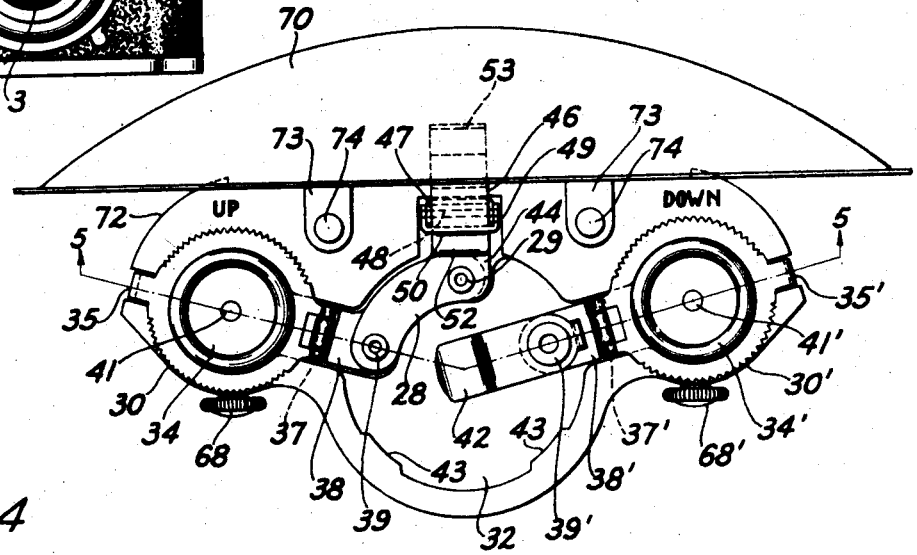
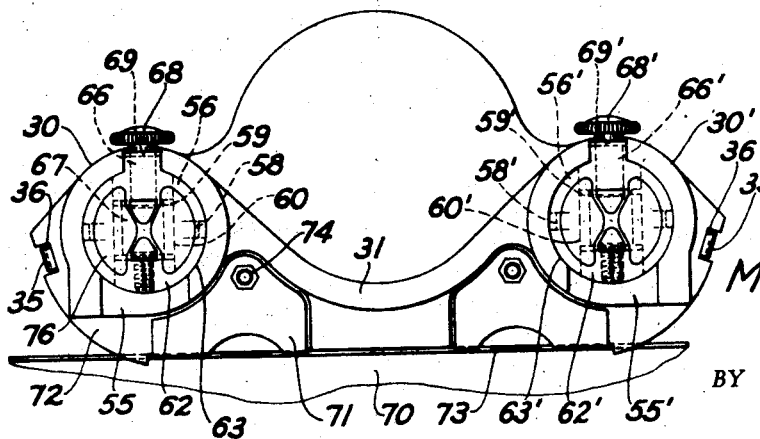
MILLER R. HUTCHISON JR.
INVENTOR
BY
ATTORNEYS June 16, 1942.  M. R. HUTCHISON, JR  2,286,808
FLASHLIGHT SYNCHRONIZING APPARATUS FOR CAMERAS
Filed April 24, 1940  2 Sheets-Sheet 2
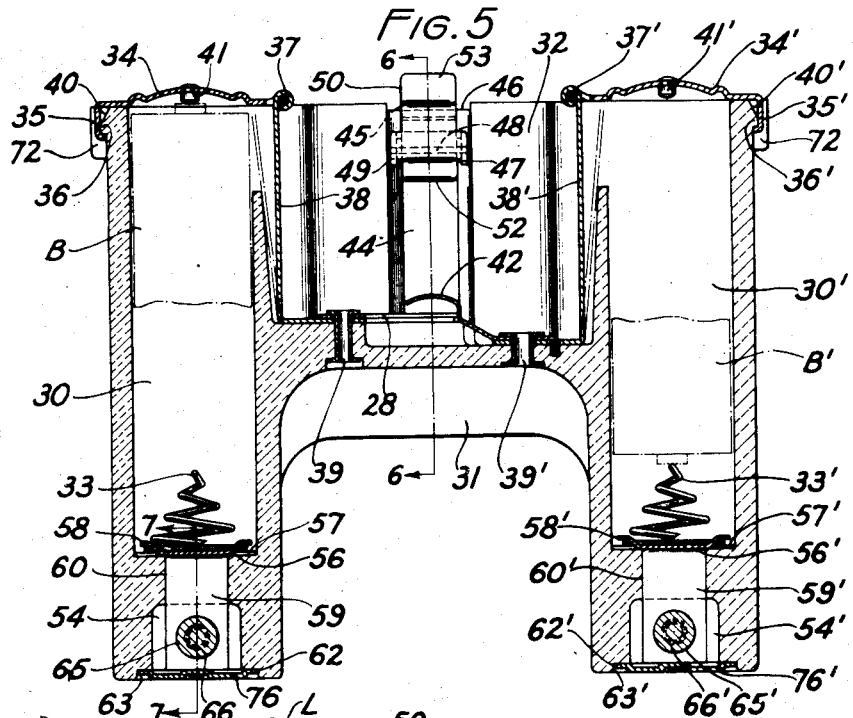
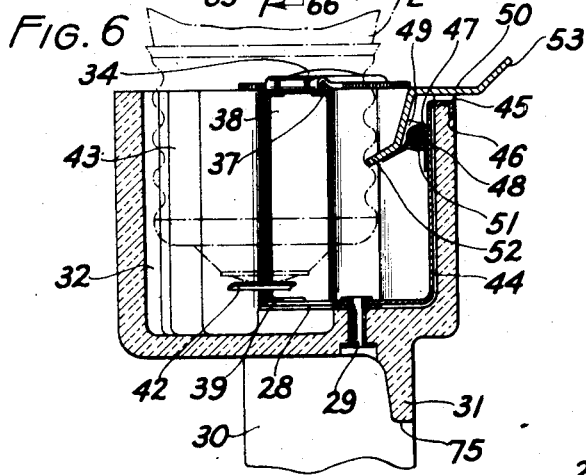
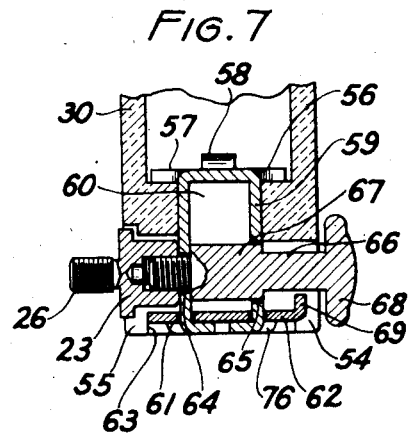
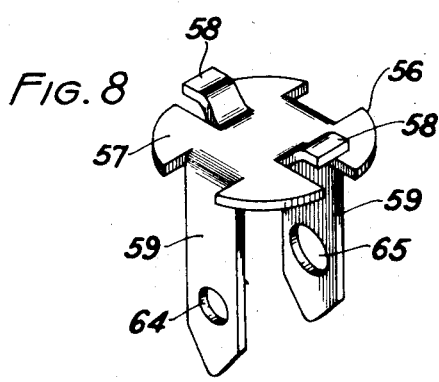
MILLER R. HUTCHISON JR.
INVENTOR
BY
ATTORNEYS Patented June 16, 1942

2,286,808

UNITED STATES PATENT OFFICE 2,286,808

FLASHLIGHT SYNCHRONIZING APPARATUS FOR CAMERAS

Miller R. Hutchison, Jr., Rochester, N. Y., assignor to Eastman Kodak Company, Rochester, N. Y., a corporation of New Jersey Application April 24, 1940, Serial No. 331,431

6 Claims. (Cl. 67—29)

The present invention relates to flashlight synchronizing apparatus for photographic cameras, and particularly to a lamp and battery unit adapted to be detachably connected to a camera having a built-in flash synchronizing arrangement whereby the lamp and batteries are adapted to be automatically connected in series with the synchronizer circuit in the camera when said unit is attached to the camera.

Since the taking of flashlight pictures has become so popular among amateur photographers the presence of cameras having built-in synchronizing arrangements has become widespread. Such cameras have the switch contacts for the flash circuit connected to the shutter operating mechanism so as to close the circuit in proper timed relation to the opening of the shutter, and the contacts are usually so arranged that the camera can be used for daylight photography in the usual way without the switch contacts affecting the normal shutter operation. While certain known cameras of this type have the lamp socket and battery case forming a part of the camera proper, others, and the majority of such cameras, have the battery and flash lamps carried in a separate unit adapted to be detachably connected to the camera when it is desired to take flashlight pictures. It is to such a separate unit, or a flashlight unit as they are generally referred to, that the present invention is directed.

One object of the present invention is to provide a flashlight unit including a source of potential and a flash lamp socket connected in series and adapted to be detachably connected to a camera having a built-in flash synchronizing circuit, said unit including attaching means electrically connected to said potential so as to automatically connect the potential and lamp socket in series with said synchronizing circuit in the camera when the unit is mounted thereon.

And another object is to provide a flashlight unit of the type described having two spaced battery housings connected together by a flash lamp socket and including a pair of attaching members each electrically connected to one terminal of separate ones of the battery housings and adapted to electrically engage attaching sockets on the camera to which the switch contacts in the camera are respectively connected.

And yet another object is to provide a flash unit of the type described having a hinged cover for each of said battery housings, and each of which covers carries one part of the electrical circuit of the unit so that the circuit is broken when the covers are opened.

And still another object is to provide a flashlight unit of the class described in which the hinge covers form a part of the electrical circuit and are mounted on hinged pintles movable laterally of the housings so as to be normally moved to a locking position.

And a further object is to provide a flashlight unit of the type described made of an insulating material in the form of an inverted U when used with a particular type of camera, and in which the metal hinged covers for the battery housings form a part of the electrical circuit of the unit, the flash lamp socket being mounted intermediate the two battery housings.

And yet another object of the present invention is to provide a flashlight unit of the type described which is cheap to manufacture, compact and pleasing in appearance, and particularly adapted for use with a particular type of camera.

The novel features that I consider characteristic of my invention are set forth with particularity in the appended claims. The invention itself, however, both as to its organization and its methods of operation, together with additional objects and advantages thereof, will best be understood from the following description when read in connection with the accompanying drawings in which:

Fig. 1 is a front elevation of a camera with a flashlight unit constructed in accordance with a preferred embodiment of the present invention attached thereto, Fig. 2 is a partial section taken through the camera, and showing a shutter and synchronizing arrangement associated therewith, Fig. 3 is a top plan view of the flashlight unit with no lamp in the socket thereof, Fig. 4 is a plan view of the bottom of the flashlight unit, Fig. 5 is a section taken substantially on line 5—5 of Fig. 3, and with the reflector removed therefrom, Fig. 6 is a section taken substantially on line 6—6 of Fig. 5, Fig. 7 is a section taken substantially on line 7—7 of Fig. 5, and showing the manner in which the attaching means on the unit is adapted to threadedly engage a socket forming a part of the camera, and Fig. 8 is an enlarged perspective of a particular form of assembly clip for electrically connecting the attaching screw of the unit to one of the terminals in the battery housing thereof.

Like reference characters refer to corresponding parts throughout the drawings.

Referring to the drawings, and particularly Figs. 1 and 2, the camera with which the flashlight unit constituting the present invention might be adapted for use may comprise a camera 1 of the box type having a front wall 2 on which the camera objective 3 is mounted, and a top wall 4 on which is mounted a view finder 5, and through which top wall the shutter release member 6 extends. Such a camera usually includes a shutter of the pivoted blade type comprising a blade 7 pivoted at 8 on the rear side of the front wall 2 of the camera, or on a wall spaced from said front wall. The blade pivots between two positions under the action of the shutter spring 9 during which pivotal movement the elongated opening 10 therein uncovers the exposure aperture 11 in the wall of a camera in alignment with the objective 3. The shutter spring 9 is adapted to be placed under operating tension by the pivotal movement of the lever 12 to one end of which the same is attached. The lever 12 is oscillated between two positions, in which it places the spring under tension to move the shutter blade in opposite directions, by a downward movement of the thrust member 13 one end 14 of which is adapted to engage alternate ones of the notches 15 and 15' in the lever 12 on either side of the pivot points thereof. One end 16 of the thrust member 13 may be attached to the under side of a top wall of a camera and formed so as to be resilient whereby it can be moved downwardly by a depression of the release member 6 extending through the top wall of the camera and may be moved upwardly by the resiliency inherent in the member itself. A depression of the thrust member 13 when the lever 12 is in the position shown in Fig. 2, will cause the end of the lever to which the spring is attached to move upward, and when the same crosses the line extending between the pivot point of the shutter and the point of attachment of the spring to the shutter blade, the shutter blade will snap downwardly. The release of the shutter release member 6 will permit the thrust member 13 to rise again, and since the other notch will then be below the end 14 of the same a subsequent depression of the release member will cause the shutter blade to snap in the other direction to make an exposure.

The camera may be provided with any sort of built-in flash synchronizing arrangement, but for the purpose of illustration I have shown such arrangement as including a switch contact 20 carried by the shutter blade and adapted to engage a second switch contact 21 when the shutter blade pivots between its two positions to close the flash lamp circuit in proper timed relation to the opening of the shutter. The switch contact 21 may be a shutter spring stretched between two pins 22 extending upwardly, and insulated, from the front camera wall which in the present instance may be metal. The contact may be electrically connected to one threaded attaching socket 23 threaded into and insulated from the front wall of the camera adjacent the top wall thereof, see Figs. 1 and 2. The first switch contact 20 may comprise two oppositely directed resilient arms 24 attached at one end to a lug 25 extending radially from the edge of the shutter blade, the ends of which arms are so positioned relative to the second switch contact 21 and the opening end of the shutter blade as to insure the flash lamp circuit being closed in sufficient time prior to the opening of the shutter to account for the "lag" characteristic of flash lamps, as is well known in the art. This contact 20 will be grounded through the metal shutter parts of the front wall of the camera to a second threaded attaching socket 23' screwed into the front wall 2 of the camera, and it is pointed out that the resistance offered to the movement of the shutter blade by the switch contact 21 is so slight as not to affect the normal operating speed of the shutter. The two threaded attaching sockets may be of the form best shown in Fig. 7 and comprise a threaded screw 26 adapted to be screwed into the front wall 2 and a threaded socket extending to the outside of the camera wall to receive corresponding attaching members on the flashlight unit for attaching the same to the camera. The particular form of camera, shutter, and synchronizing arrangement associated therewith form no part of the present invention except in so far as it cooperates with the flashlight unit hereinafter described, and it is pointed out that the flashlight unit constituting the present invention is not necessarily limited to use with a camera so equipped.

Coming now to the present invention, and referring to Figs. 3-7, the flashlight unit may comprise a pair of open ended battery housings 30, 30' connected in spaced relation by a partition 31 extending between the upper end of the battery housings and provided with a recess 32. This unit may be made of a plastic insulating material and be molded in a single operation. Situated in the lower end of each battery housing 30, 30' is a terminal constituting a coil spring 33, 33'. Each battery housing is adapted to receive one battery, indicated in dot-dash lines as B and B' Fig. 5, the battery in one housing being placed right side up with the negative terminal thereof engaging the spring 33, and the other battery being placed in its housing bottom side up so that its positive terminal engages the coil spring 33'. This arrangement of the batteries is necessary in order to be connected in series with one another and the lamp socket hereinafter described, and the upper end of each battery housing may be labeled "Up" and "Down" to indicate the manner in which the batteries are to be inserted thereinto to insure a proper circuit in the unit, see Fig. 3.

Each of the open ends of the battery housings 30, 30' is adapted to be closed by a hinged cover 34, 34' having a latch member 35, 35' adapted to engage an overhanging lip 36, 36' on the upper end of the housing to lock the cover in closed position, see Fig. 5. In order to normally move the hinged cover laterally of the housing to a latching position, the hinged pintle 37, 37' for each cover is mounted on the free end of a cantilever spring 38, 38' which is attached to the bottom of the recess 32 by any suitable means such as rivets 39, 39'. Each of the cantilever springs 38, 38' normally tends to pull the hinged pintle and cover attached thereto toward the center of the recess 32 whereby the covers are normally moved to a locking position when closed. Due to this arrangement, in order to open the covers, they must first be moved laterally against the action of their respective cantilever springs to release the latch member from the overhanging lips. Each of the ribs R, R' acts to prevent overstressing the cantilever springs 38, 38' when closing covers 34, 34', and during which time the cantilever springs 38, 38' may take the position shown by dotted lines in Fig. 5. The top side of each of the overhanging lips is tapered, as best shown at 40, 40', so that when the covers are hinged shut, the latch member will engage said tapered portion and be cammed laterally over the lips after which the cantilever spring is snapped into a locking position.

Each hinged cover 34, 34' is provided with a metal button 41, 41' which is adapted to electrically engage the second terminal of the battery in the housing it is associated with, and the covers are metal so that they, along with the hinged pintles and cantilever springs, form part of the electrical circuit in the flashlight unit. The recess 32 is slightly larger in diameter than the base of a flash lamp L to be inserted thereinto so that said lamp may be inserted into, or removed from, the same with a straight thrust or pull, respectively. One socket contact 42 extends into the center of the recess 32 and is adapted to engage the center contact in the base of the flash lamp L when the same is inserted into the recess. This contact 42 will be electrically connected to the cantilever spring 38', and will be resilient so as to normally force a lamp inserted into the recess upwardly.

Referring to Fig. 6, a metal strip 44 is electrically connected at the end of the cantilever spring 38 by the arcuate contact strip 28 connected thereto by rivet 39 and riveted to the base of the recess along with one end of the strip by a rivet 29. This metal strip extends along the base of the recess 32 and up the side thereof where its upper end is turned over at 45 to engage a cut-out 46 in the wall of the recess. That portion of this strip extending up the side of the recess 32 includes two spaced ears 47 supporting a pintle 48 to which a pair of spaced ears 49 and the latch member 50 are pivoted. The latch member 50 is normally spring pressed to the position shown in Fig. 6 by a coil spring 51 wrapped around the pintle 48 so that the end 52 of the latch member will engage a thread on the base of the lamp inserted into the recess to positively lock the lamp against removal from the recess. To release the latch from locking engagement with the lamp base, it is only necessary to exert pressure on the end 53 of the latch member extending to the outside of the recess, and though an opening, not shown, in the reflector 70, to turn the same in a counter-clockwise direction. The latch member normally forces the base of the lamp inserted into the recess against two arcuately spaced ribs 43 extending radially into the recess opposite the latch member, and being electrically connected to the battery in the housing 30 serves as one socket contact engaging the metal shell surrounding the base of the lamp.

It will be readily understood that when there are batteries in the housing, the battery housing covers are closed, and there is a lamp in the recess 32, the terminal coil springs 33, 33' of the two battery housings are connected in series. It is only necessary, therefore, to provide means for attaching the unit to the camera by engaging the two sockets on the front thereof, and to electrically connect the respective terminals in the battery housings to such attaching means so that they will be automatically electrically connected to opposite ones of the switch contacts in the camera when the unit is attached thereto.

To this end, the lower end of each battery housing is provided with a slot 54, 54' extending transversely thereof, the end of said slot at the rear side of each housing being formed as shown at 55, see Fig. 7, to receive the end of one of the threaded sockets 23, 23' on the front of the camera. A pair of metal assembly clips 56, 56' of the form best shown in Fig. 8 serve as means for holding the terminal coil springs in each battery housing, and electrically connecting the same to an attaching screw carried by the unit for threadedly engaging the sockets on the camera, in the manner hereinafter described.

Inasmuch as both terminal coil springs are mounted in their housings in the same manner only the manner of mounting one will be described in detail, corresponding parts on the other being indicated by the same numerals primed ('). Each metal assembly clip comprises a circular head 57 having two diametrically spaced upturned ears 58 and two diametrically spaced downwardly extending arms 59. The lower coil of one coil spring 33 is slipped between the head of the clip and the two upturned ears 58 thereon and the clip is located in the bottom of the battery housing with the arms 59 extending downwardly through a square hole 60 in the bottom of the housing and across the slot 54 therein. The lower end of the arms 59 of the clip are tapered and extend through suitable slots 61 in a washer 62 located in a recess 63 in the base of the housing. The ends of the arms 59 are turned over, as best shown in Fig. 7, so that the assembly clip draws upwardly on the washer and downwardly on the coil spring 33 to hold the three parts in assembled relation without the necessity of screws, or other manually adjusted attaching means. The washer 62 may be embossed, as is shown at 76 in Figs. 4 and 5, to make the lower edge of the same flush with the bottom edge of the battery housing with which it is associated.

Each arm 59 of each assembly clip 56 is provided with an aperture 64, 65 in alignment with one another and through which the attaching screw 66 rotatably extends. The aperture 64 is of a diameter to slidably receive the threaded end of the attaching screw 66, while the aperture 65 is reamed larger than aperture 64 to rotatably engage the enlarged portion 67 of the screw, as best shown in Fig. 7. The threaded end of each of the attaching screws is adapted to engage one of the threaded sockets 23, 23' on the camera front to attach the unit thereto, and when the screw is turned by the knob 68 the threaded end of the screw will move into the socket carrying the unit toward the camera by virtue of the fact that the enlarged portion 67 of the screw cannot pass through the aperture 64 in the arm 59 of the assembly clip. Referring to Fig. 7, it will be noticed that each attaching screw 66 is prevented from becoming accidentally disengaged from the unit by virtue of a turned-up lug 69 on the washer 62 which extends radially of the screw and into the path of the enlarged portion 67 thereof.

A reflector 70 may be attached to the flashlight unit in any suitable manner. By way of illustration I have shown the reflector 70 provided with two lugs 71 formed to engage the under side of a horizontal flange 72 on the rear of the unit, and two ears 73 adapted to engage the upper side of the same flange, the two being secured to the flange by bolts 74 passing through apertures therein and the flange, see Figs. 3 and 4.

Referring to Figs. 1 and 2, it will be noticed that the attaching sockets 23, 23' on the camera are located adjacent the top wall thereof so that when the flashlight unit is mounted on the camera the cut-out 75 between the lower ends of the battery housings in the partition 31 lines up with the view finder 5 on the camera so that the use of the same is not impaired. When the unit is attached to the camera the switch contacts 20 and 21 in the camera are automatically connected in series with the electrical circuit of the unit so that when the same are moved into engagement upon operation of the camera shutter the lamp will be flashed. When the flashlight unit is removed from the camera, the camera appears, and operates, the same as any camera not adapted for flashlight pictures so that one camera possessing the advantages of two is provided for the added expense of the flashlight unit only.

Two of the main requirements of a flashlight unit of this type are that the same be compact and neat in appearance, and at the same time be cheap to manufacture. These two requirements have been fulfilled in the present unit by the particular arrangement of parts used, and the ease in assembling the same. The battery housings and lamp socket are moldable as a single unit and the parts constituting the electrical circuit of, and attaching means for, the unit are readily assembled into said unit in the easiest and most efficient manner. The novel self-latching hinged covers for the battery housings insure against the accidental removal of the batteries from the housings, and making said covers serve as part of the electrical circuit in the unit results in a reduction of the number of parts required in the unit whereby the cost of the same is reduced to a minimum.

Although I have shown and described a certain specific embodiment of my invention, I am fully aware that many modifications thereof are possible. My invention, therefore, is not to be restricted except in so far as is necessitated by the prior art and the spirit of the appended claims.

Having thus described my invention what I claim is new and desire to secure by Letters Patent of the United States is:

1. For use with a photographic camera having a built-in flash synchronizing arrangement including two separate switch contacts within the camera adapted to be brought into engagement upon operation of the shutter, a flashlight unit comprising a pair of spaced battery housings, a terminal associated with each of said housings, a battery in each of said housings and disposed so that the positive side of one battery engages the terminal of the housing in which it is contained, and the negative side of the other battery engages the terminal in the housing in which it is contained, a partition extending between, and connected to, each of said housings and provided with a recess, an electrical socket in said recess adapted to receive a flash lamp, means for connecting said batteries and socket in series, said means including a pair of contacts each electrically connected to a different one of the socket contacts, and each pivotally connected to one of said housings to move to and from an operative position wherein it electrically engages the side of the battery opposite to that engaged by the terminal in the housing with which it is associated and confines the battery within its housing, and means for detachably connecting said unit to the camera, said means being electrically connected to said terminals of said unit and adapted to automatically connect said terminals to said switch contacts in the camera when the unit is mounted on said camera.

2. For use with a photographic camera having a built-in flash synchronizing arrangement including two switch contacts within the camera adapted to be brought into engagement upon operation of the camera shutter, each of said switch contacts electrically connected to one of a pair of sockets in one wall of the camera, a flashlight unit comprising a pair of open-ended battery housings into each of which a battery is adapted to be inserted, a partition provided with a recess connected to, and interposed between, each of said battery housings adjacent one end thereof, a terminal in each of said battery housings adapted to be electrically connected to one side of the battery in the housing, a hinged cover for closing the open end of each of said battery housings, a latch member on each of said covers adapted to releasably engage a complementary latch element on the wall of the battery housing when the cover is moved laterally thereof when in a closed position, means normally acting on each of said covers to move the same laterally of the housings they close and to a locking position, means for connecting said batteries and socket in series, said means including a contact carried by each of said covers and adapted to be electrically connected to one side of said batteries in the housing when the covers are closed, means for electrically connecting each of said contacts to separate ones of the two socket contacts, a pair of attaching members on said unit adapted to engage said sockets on the camera for detachably mounting the unit thereon, each of said attaching members connected to one of said terminals whereby the switch contacts in the camera are automatically connected in series with the circuit of the unit when said unit is attached to the camera.

3. For use with a photographic camera having a built-in flash synchronizing arrangement including two switch contacts within the camera adapted to be brought into engagement upon operation of the camera shutter, each of said switch contacts electrically connected to one of a pair of sockets in one wall of the camera, a flashlight unit comprising a pair of open-ended battery housings into each of which a battery is adapted to be inserted, a partition provided with a recess connected to, and interposed between, each of said battery housings adjacent one end thereof, a terminal in each of said battery housings adapted to be electrically connected to one side of the battery in the housing, a hinged cover for closing the open end of each of said battery housings, a latch member on each of said covers adapted to releasably engage a complementary latch element on the wall of the battery housing when the cover is moved laterally thereof when in a closed position, means for normally moving each of said covers laterally of said battery housings and to a locking position, said means including a movable support adjacent each housing and movable laterally of said housings, the hinge pintle for each cover fixed to one of said supports to move therewith, and resilient means normally acting on each of said supports to move the same laterally of the housing, means for connecting said batteries and socket in series, said means including a contact carried by each of said covers and adapted to be electrically connected to one side of said batteries in the housings when the covers are closed, means for electrically connecting each of said contacts to separate ones of the two socket contacts, a pair of attaching pins on said unit adapted to engage said sockets on the camera for detachably mounting the unit thereon, each of said attaching pins electrically connected to one of said terminals whereby the switch contacts in the camera are automatically connected in series with the circuit of the unit when said unit is attached to the camera.

4. For use with a photographic camera having a built-in flash synchronizing arrangement including two switch contacts within the camera adapted to be brought into engagement upon operation of the camera shutter, each of said switch contacts electrically connected to one of a pair of sockets in one wall of the camera, a flashlight unit comprising a pair of open-ended battery housings into each of which a battery is adapted to be inserted, a partition provided with a recess connected to, and interposed between, each of said battery housings adjacent one end thereof, a terminal in each of said battery housings adapted to be electrically connected to one side of the battery in the housing, a hinged cover for closing the open end of each of said battery housings, a latch member on each of said covers adapted to releasably engage a complementary latch element on the wall of the battery housing when the cover is moved laterally thereof when in a closed position, means for normally moving each of said covers laterally of said battery housings and to a locking position, said means including a cantilever spring fixed in the bottom of said recess with its free end extending upwardly adjacent the open end of one housing and normally spaced laterally thereof, the hinge pintle for one of said covers carried by the free end of said spring to move therewith, means for connecting said batteries and socket in series, said means including a contact carried by each of said covers and adapted to be electrically connected to one side of said batteries in the housings when the covers are in a closed position, means for electrically connecting each of said contacts to separate ones of the two contacts in said socket, a pair of attaching pins fixed to said battery housings and electrically connected to said terminals therein, said attaching pins adapted to engage said sockets in the wall of the camera for attaching the unit thereto and adapted to automatically connect said switch contacts in the camera in series with the circuit contained in the unit.

5. For use with a photographic camera having a built-in flash synchronizing arrangement including two switch contacts within the camera adapted to be brought into engagement upon operation of the camera shutter, each of said switch contacts electrically connected to one of a pair of threaded sockets in one wall of the camera, a flashlight unit comprising a pair of open-ended insulating battery housings into each of which a battery is adapted to be inserted, an insulating partition provided with a recess connected to, and interposed between, each of said battery housings adjacent one end thereof, a terminal in each of said battery housings adapted to be electrically connected to one side of the battery in the housing, a metal cover hinged adjacent the open end of each of said housings, for closing the same and adapted to engage and be electrically connected to the side of the battery opposite to that engaged by the terminal in the housing with which it is associated, a latch member on each of said covers adapted to releasably engage a complementary latch element on the wall of the battery housing when the cover is moved laterally thereof when in a closed position, means normally moving each of said covers laterally of its associated housing and to a locking position, an electrical socket situated in said recess for the reception of a flash lamp, means for connecting said batteries and socket in series, said means including said metal covers, an attaching screw rotatably mounted on each of said battery casings and electrically connected to the terminal therein, said attaching screws adapted to be screwed into said threaded sockets on the wall of the camera for attaching the unit to the camera, and adapted to connect said switch contacts in the camera in series with the circuit contained in the unit.

6. For use with a photographic camera having a built-in flash synchronizing arrangement including two switch contacts within the camera adapted to be brought into engagement upon operation of the camera shutter, each of said switch contacts electrically connected to one of a pair of sockets in one wall of the camera, a flashlight unit comprising an inverted U-shaped insulating member, each of the said arms of said member recessed to provide open-ended battery housings into each of which a battery is adapted to be inserted, the cross arm of said member provided with a recess, a metal terminal in the bottom of each of said battery housings adapted to be electrically connected to one side of a battery in the housing, an electrical socket located in the recess in said cross arm and adapted to receive a flash lamp, means for connecting said terminals, batteries, and socket in series, said means including a pair of cantilever springs, each fixed in said recess and electrically connected to one of the contacts of said socket, the free end of each of said springs extending adjacent the open end of one of said housings and normally moved laterally and away from the housing with which it is associated, a hinge pintle carried on the free end of each of said springs, a metal cover pivoted to each of said pintles for moving to and from a covering position relative to the open end of the housing with which it is associated, and adapted when in a closed position to be electrically connected to the side of the battery opposite that engaged by the terminal in said housing, a latch member carried by each of said covers adapted to engage a complementary latch element on the wall of the housing with which it is associated when the cover is moved laterally of the housing when in a closed position, an attaching screw extending radially of, and rotatable relative to, the lower end of each of said arms and adapted to threadedly engage said sockets on the camera for attaching the unit thereto, and means for electrically connecting said attaching screws to the terminal in the housing with which it is associated whereby the switch contacts in the camera are adapted to be connected in series with the circuit in the unit when said unit is mounted on the camera.

MILLER R. HUTCHISON, Jr.